No. 687,057. Patented Nov. 19, 1901.
H. N. PARKER.
WHEEL FOR TOY VEHICLES.
(Application filed May 14, 1900.)
(No Model.)

Witnesses
H. M. Rugg.
Ava T. Murphy.

Inventor
Homer N. Parker
By Rufus B. Fowler, Atty.

THE NORRIS PETERS CO., PHOTO-LITHO., WASHINGTON, D. C.

UNITED STATES PATENT OFFICE.

HOMER NEWTON PARKER, OF WINCHENDON, MASSACHUSETTS.

WHEEL FOR TOY VEHICLES.

SPECIFICATION forming part of Letters Patent No. 687,057, dated November 19, 1901.

Application filed May 14, 1900. Serial No. 16,595. (No model.)

*To all whom it may concern:*

Be it known that I, HOMER NEWTON PARKER, a citizen of the United States, and a resident of Winchendon, in the county of Worcester and Commonwealth of Massachusetts, have invented certain new and useful Improvements in Wheels for Toy Vehicles, of which the following is a specification, reference being had to the accompanying drawings, forming a part of the same, in which—

Figure 2:
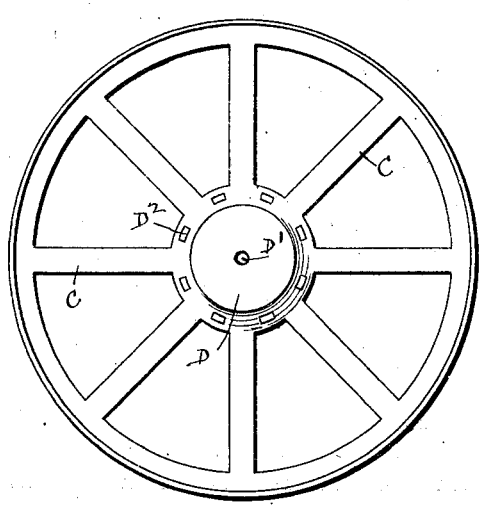
Figure 1:
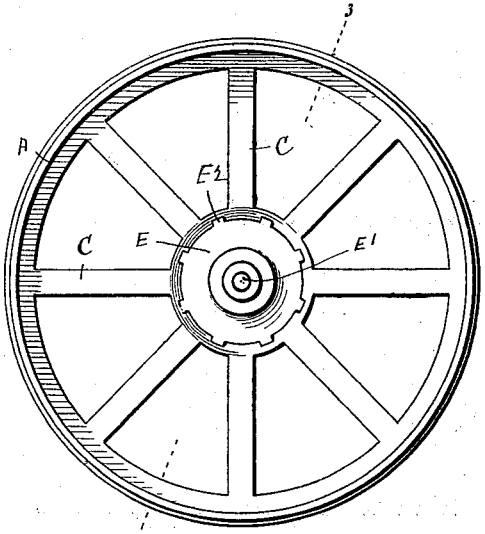
Figures 3, 4, 5:
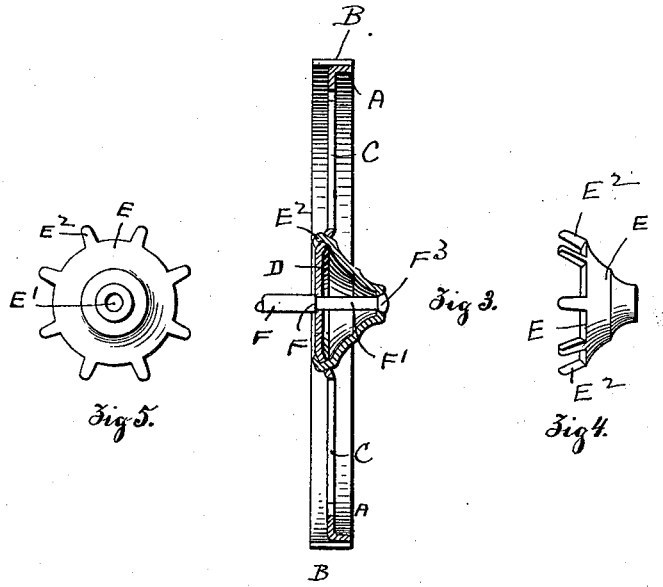

Figure 1 represents a side view of a wheel embodying my invention. Fig. 2 is a side view of my improved wheel with the hub removed. Fig. 3 is a sectional view on line 4 4, Fig. 1; and Figs. 4 and 5 are detached views of the hub.

Similar reference-letters refer to similar parts in the different views.

The object of my present invention is to provide a wheel for toy vehicles which can be stamped from sheet metal and provide means for its secure attachment to a rotating axle; and it consists in the construction and arrangement of parts, as hereinafter described, and set forth in the annexed claims.

Referring to the drawings, Fig. 1 represents a side view of a wheel embodying my invention, in which the body of the wheel, as represented in Fig. 2, is stamped from a single piece of sheet metal and comprises a rim A, consisting of a flange turned up on one side of the wheel, upon which a tire B may be attached, if desired, spokes C, and a center D, provided with a central hole D' to receive the axle and a series of holes $D^2$, concentric with the hole D', to provide for the attachment of the hub. The hub, which is represented as detached from the wheel in Fig. 3, is stamped from sheet metal and consists of a T-shaped washer E, provided with a central hole E' to receive the end of the axle and a series of projecting prongs $E^2$, adapted to enter the holes $D^2$ and be bent over or clenched against the center D of the wheel, thereby drawing the edge $E^3$ of the hub firmly against the body of the wheel. The axle F has its end reduced in diameter, as at F', to enter the holes D' and E', forming a shoulder $F^2$, which bears against the center of the wheel-body, with the end of the axle projecting through the hub E far enough to be upset or riveted and form a head $F^3$, which holds the wheel securely upon the axle. The hub is stamped from soft or annealed sheet metal, which enables the prongs $E^2$ to be bent closely against the rear side of the wheel-body, so as to draw the edge E into firm contact with the side of the wheel. The wheel is supported upon the axle by the center D, resting against the shoulder $F^2$, and by the bottom of the hub E, which is held by the head $F^3$, thereby forming two points of support upon the axle which are separated by the distance between the center D and the bottom of the hub, and thereby holding the wheel securely at right angles to the axle.

What I claim as my invention, and desire to secure by Letters Patent, is—

1. The within-described wheel for toy vehicles comprising a wheel-body consisting of a rim, spokes and a center, said wheel-center having a central hole for the axle and a series of concentric holes, a hub formed from sheet metal and provided with a central hole for the axle and a series of prongs, said hub being attached to the wheel-body by the insertion of its prongs in said concentric holes, substantially as described.

2. The combination in a wheel for toy vehicles of a wheel-body comprising a center and a dished hub, said wheel-center and dished hub being in separate pieces and provided with concentric holes in alinement to receive an axle, and means for attaching said wheel-center and said dished hub, whereby two points of support are provided for the axle, substantially as described.

3. In a wheel for toy vehicles, the combination of a wheel-body, a dished hub provided with prongs projecting from the periphery of the hub and clenched against said wheel-body, said wheel-body and said dished hub having concentric holes in alinement to receive an axle and provide two supporting-surfaces therefor, substantially as described.

In testimony whereof I have signed my name to this specification, in presence of two subscribing witnesses, this 10th day of May, 1900.

HOMER NEWTON PARKER.

Witnesses:
HARRY EDISON PARKER,
WALTER BOYCE.